(12) United States Patent
Hansson et al.

(10) Patent No.: US 6,601,486 B2
(45) Date of Patent: Aug. 5, 2003

(54) TOOTHED TOOL COUPLING FOR METAL CUTTING DEVICES

(75) Inventors: Per Hansson, Gävle (SE); Sture Sjöö, Gävle (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/859,379

(22) Filed: May 18, 2001

(65) Prior Publication Data

US 2002/0002886 A1 Jan. 10, 2002

(30) Foreign Application Priority Data

May 18, 2000 (SE) .......................................... 00018275

(51) Int. Cl.$^7$ ............................................. B23B 29/00
(52) U.S. Cl. ........................ 82/161; 403/382; 407/101; 407/103; 407/117
(58) Field of Search ........................ 82/160, 161, 158; 407/101, 102, 103, 109, 110, 117; 409/232, 234; 403/345, 353, 359.1, 382

(56) References Cited

U.S. PATENT DOCUMENTS

| | | | |
|---|---|---|---|
| 4,580,472 A | * 4/1986 | Kastner | 82/161 |
| 4,611,383 A | * 9/1986 | Sonnek | 409/234 |
| 4,632,614 A | * 12/1986 | Rall et al. | 279/58 |
| 4,655,655 A | * 4/1987 | Schurfeld | 403/380 |
| 5,150,636 A | 9/1992 | Hill | |
| 5,660,494 A | * 8/1997 | Schwarzler et al. | 403/359.6 |
| 5,779,551 A | * 7/1998 | Stall et al. | 403/284 |
| 6,183,230 B1 | * 2/2001 | Beardmore et al. | 403/359.6 |
| 6,244,780 B1 | * 6/2001 | Hansson | 279/67 |
| 2002/0003985 A1 | * 1/2002 | Hansson et al. | 403/359.1 |

FOREIGN PATENT DOCUMENTS

| | | |
|---|---|---|
| DE | 3402547 | 8/1985 |
| SE | 510 852 | 6/1999 |

OTHER PUBLICATIONS

U.S. patent application Ser. No. 09/859,375, field May 18, 2001, Per Hansson et al., "Toothed Tool Coupling for Rotating a Rotary Tool".

* cited by examiner

Primary Examiner—Daniel W. Howell
(74) Attorney, Agent, or Firm—Burns, Doane, Swecker & Mathis, LLP

(57) ABSTRACT

A metal cutting tool includes a stationary tool holder and a mounting body therefor. The tool holder includes a first coupling part which is restrained by a second coupling part on the mounting body. The coupling parts are coaxially arranged one inside of the other. The coupling pars are conical as viewed in a longitudinal section plane containing the axis. The first coupling part includes teeth projecting generally radially with respect to the axis and received in respective radially-open recesses formed in the second coupling part. Each of the teeth makes contact with a wall of the respective recess at first and second contact places which are respectively situated on opposite sides of a generally radial line of symmetry of the tooth. The contact places are operable to transmit a restraining force from the second coupling part to the second coupling in respective directions. A restraining angle in the range of −5° to +45° is formed at each contact place.

19 Claims, 6 Drawing Sheets

TOOTHED TOOL COUPLING FOR METAL CUTTING DEVICES

This application is based on and claims priority under 35 U.S.C. §119 with respect to Sweden Application No. 0001827-5 filed on May 18, 2000, the entire content of which is incorporated herein by reference.

1. Technical Field of the Invention

The present invention relates to a tool coupling for stationary metal cutting tools, preferably for turning tools. The tool coupling couples together a holder and a tool body which is intended to carry (or by itself constitute) a cutting insert for chip removing machining. The tool coupling comprises a male part, which has a first center axis, and a female part, which has a second center axis. The male part and female part are intended to be received one in the other. The invention also separately relates to a cutting insert for chip removing machining.

2. Prior Art

A replaceable cutting body, i.e., a so-called loose top, that is attached to a shaft is previously known from DE-OS 34 02 547. The tool in question is especially suited for internal turning. The connection between the cutting body and the shaft is formed in such a way that three radial grooves are formed in the end of the shaft facing the cutting body, while three radial ridges are arranged on the cutting body. In the active position of the connection, an axial screw extends through the cutting body and into the shaft, the ridges being received in the grooves. Thereby, a torque may be transferred from the shaft to the cutting body. By virtue of a relatively flat inclination of the co-operating flanks of the grooves and the ridges, a relatively high axial force is required between the shaft and the cutting body in order to transfer torque of the magnitude desired from the shaft to the cutting body. The high axial force may lead to an elongation of the screw. Furthermore, it is difficult to define where abutment between the ridges and grooves will take place since the ridges and grooves have a linear extension.

Aims and Features of the Invention

A primary aim of the present invention is to provide a tool coupling of the kind defined in the introduction, the tool coupling being capable of transmitting large torques or restraining force.

Another aim of the present invention is that also at a moderate axial prestress, there is an exceptionally small risk of failure of the transmission of torque.

Yet another aim of the present invention is that the tool coupling should be self-centering.

An additional aim of the present invention is that the tool coupling is free of play according to one embodiment.

At least the primary aim of the present invention is realized by the combination of a stationary metal cutting tool holder and a mounting body therefor. The tool includes a body having at least one seat for receiving a cutting insert. A securing element secures the tool holder to the mounting body. The tool holder includes a first coupling part defining a center axis. The mounting body includes a second coupling part arranged coaxially with the first coupling part. The first and second coupling parts are conical as viewed in a longitudinal sectional plane containing the axis, and are arranged one inside of the other. The first coupling part includes teeth spaced circumferentially apart about the axis and projecting generally radially with respect to the axis. The teeth are received in respective radially open circumferentially spaced recesses formed in the second coupling part. Each of the teeth terminates in an axially facing wall and includes a sidewall contacting a sidewall of the respective recess. A curvature of the tooth sidewall is different from a curvature of the recess sidewall at locations where those sidewalls contact one another. Such contact is in the form of a point contact on each side of a generally radial line of symmetry of the respective tooth as viewed in a direction parallel to the access. Each of the contact points is operable to transmit a restraining force from the second coupling part to the first coupling part in a respective direction. Each of the contact points defines a tangent line, wherein the restraining force is transmitted along a line of force oriented perpendicular to a respective tangent line. A restraining angle in the range of −5° to +45° is formed between the bisector and a line extending perpendicular to the line of force.

The invention also pertains to a metal cutting insert for chip removing machining. The insert includes a body having a top surface with an integral cutting edge, and a bottom surface with an integral coupling part. The coupling part defines a center axis and is conical as viewed in a longitudinal section plane containing the axis. The coupling part includes a plurality of teeth spaced circumferentially apart about the axis and extending generally radially with respect to the axis.

BRIEF OF DESCRIPTION OF THE DRAWINGS

Below, preferred embodiments of the tool coupling according to the present invention will be described, reference being made to the accompanying drawings, wherein.

DETAILED DESCRIPTION OF PREFERRED EMBODIMENTS OF THE PRESENT INVENTION

Figure 1:
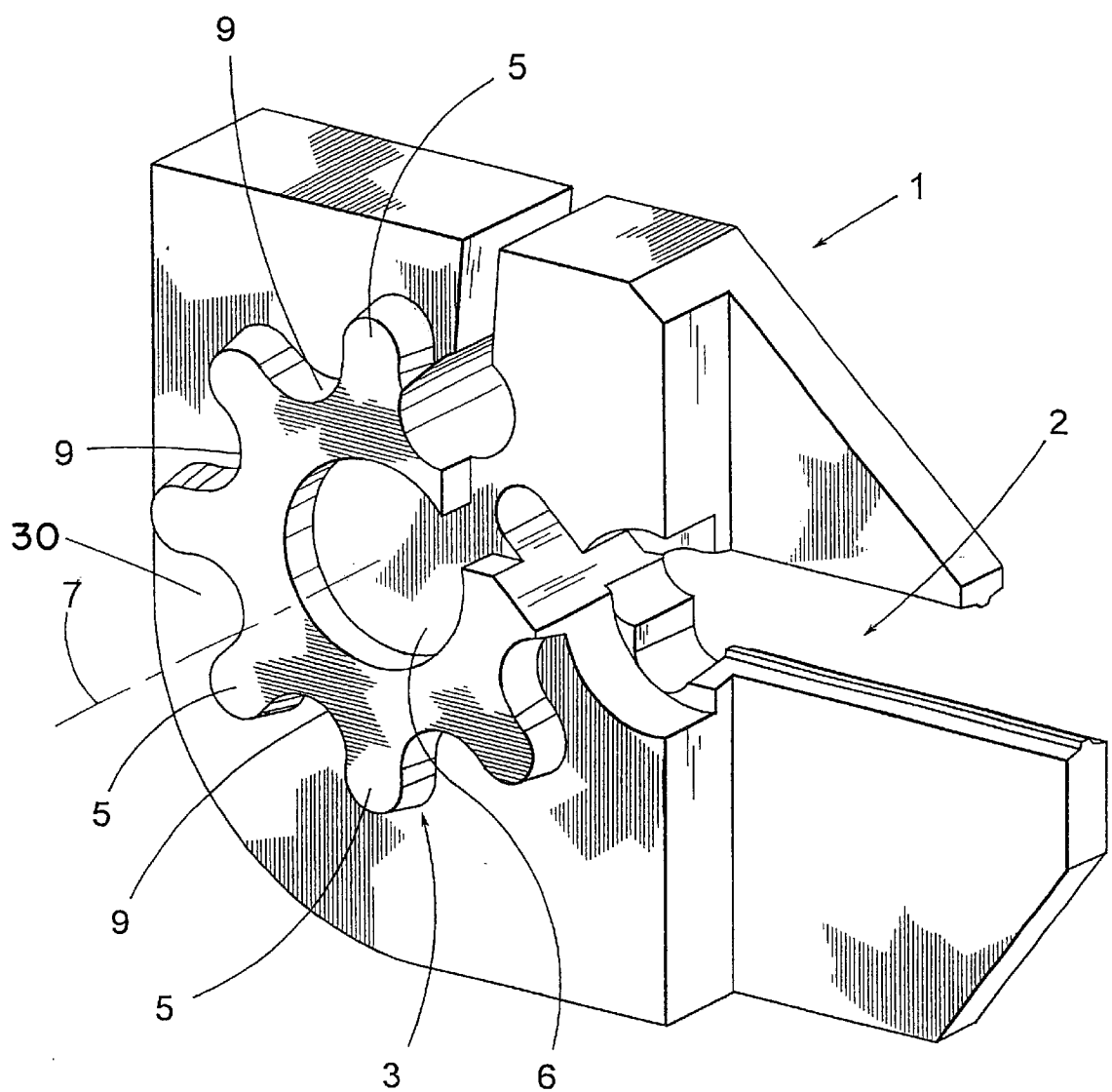
FIG. 1 shows a perspective view of a tool holder for a parting tool, said tool holder having a male part of the tool coupling according to the present invention.
Figure 2:
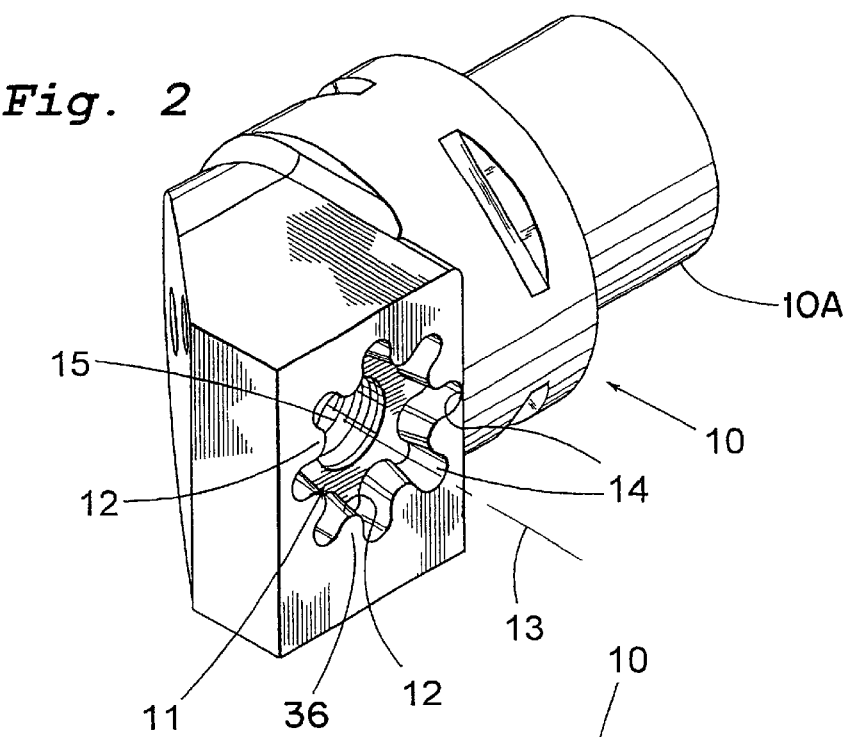
FIG. 2 shows a perspective view of tool body, which has a female part of the tool coupling according to the present invention.
Figure 3:
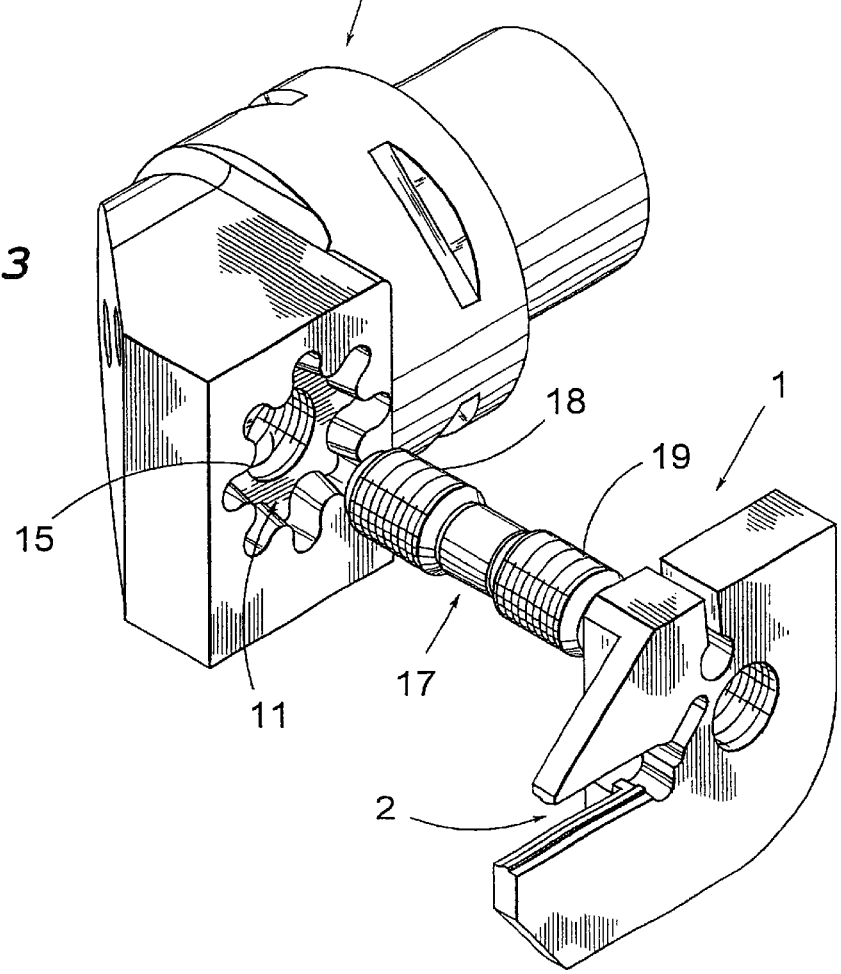
FIG. 3 shows an exploded view in perspective of the parts included in a tool, the tool having a tool coupling according to the present invention.

The tool illustrated in FIGS. 1–3 is stationary and intended to be used for, for instance, parting and grooving, the tool comprising an adapter in the form of a tool holder, 1, which is provided with a male coupling part 3 of a tool coupling according to this embodiment of the present invention, which male part will be described in more detail below. The tool holder 1 also comprises an insert seat 2 for receipt of a cutting insert (not shown) for chip removing machining.

The male part 3, which is most clearly seen in FIG. 1, is disposed on an axially facing surface 30 of the tool holder 1 and comprises a number of teeth 5, which are circumferentially spaced-apart from each other, and which form a tangent to an imaginary circle having its center lying on a first center axis 7. The teeth 5 are directed away from said first center axis 7. The teeth 5 are spaced-apart by a number of recesses 9, which are also circumferentially spaced-apart from each other, and which form a tangent to an imaginary circle having its center lying on the first center axis 7. The recesses 9 are open in a direction away from said first center axis 7. The male part 3 has a slightly conical shape as seen in a longitudinal section plane containing the axis (see FIG. 4), the conicity defined by a cone angle β. The cone angle β is on the order of 1°–30°, preferably 2°–14°. In the center of the male part 3, a first internally threaded cylindrical hole 6 is provided having the center thereof lying on the first center axis 7.

Figure 4:
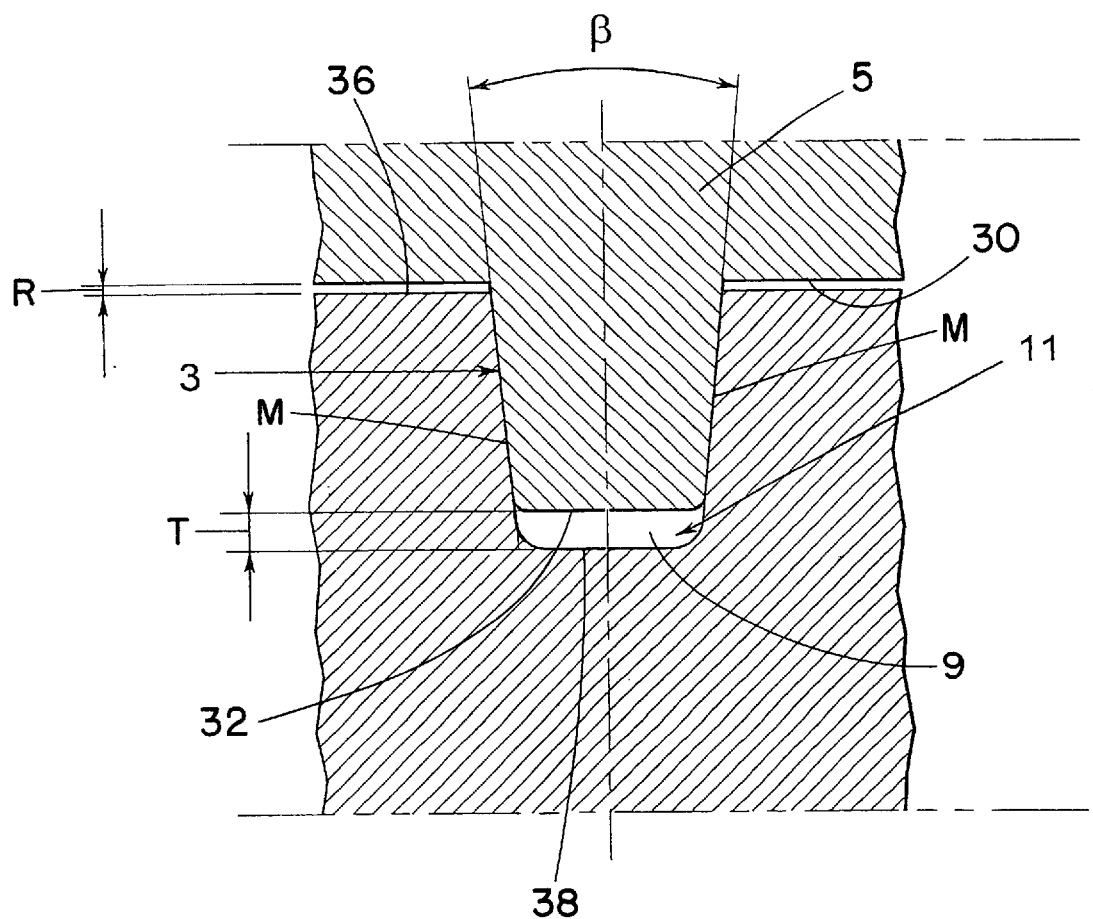
FIG. 4 shows a section along A—A in FIG. 9 through a contact area between the male and female parts in an assembled state.
Figure 9:
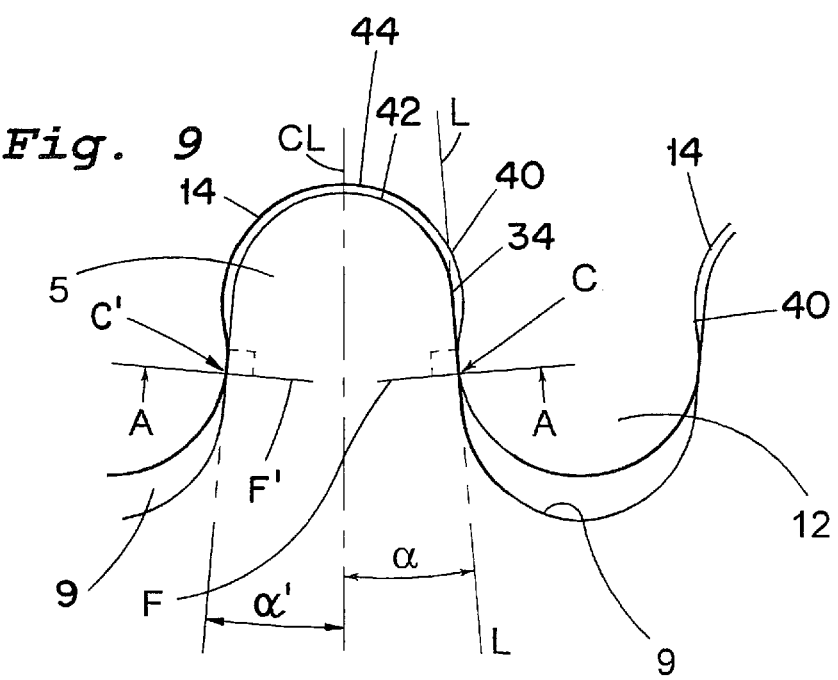
FIG. 9 shows in detail how teeth and recesses co-operate in a tool coupling according to the present invention.

With reference to FIG. 4, each of the teeth 5 terminates axially in an axially facing wall 32 which is axially offset from the axially facing end surface 30. As can be seen in FIG. 9, each tooth 5 includes a sidewall 34 extending from one adjacent recess 9 to the other adjacent recess 9. That sidewall 34 also defines one-half of a side wall of each of the two adjacent recesses 9.

In FIG. 2 a tool mounting body 10 is shown, one end 10A of which is intended to be coupled to a machine tool. At the opposite end thereof, the tool mounting body 10 has a female drive part 11 forming part of the tool coupling according to the present invention. The female part 11 is formed in an axially facing surface 36 of the body 10 and is formed to fit with the male part 3, i.e. the male part 3 is received in the female part 11. The female part 22 comprises a number of teeth 12, which are circumferentially spaced-apart from each other, and which form a tangent to an imaginary circle having its center lying on a second center axis 13, and are directed towards said second center axis 13. The teeth 12 are spaced-apart by a number of recesses 14, which are also spaced-apart from each other, and which form a tangent to an imaginary circle having its center lying on the second center axis 13. The recesses 14 are open toward the second center axis 13. The female part 11 has a slightly conical shape as viewed in the longitudinal section plane of FIG. 4, with a conicity equaling the conicity of the male part 3. In the center of the female part 11, a second internally threaded cylindrical hole 15 is provided having the center thereof lying on the second center axis 13.

Figure 6:
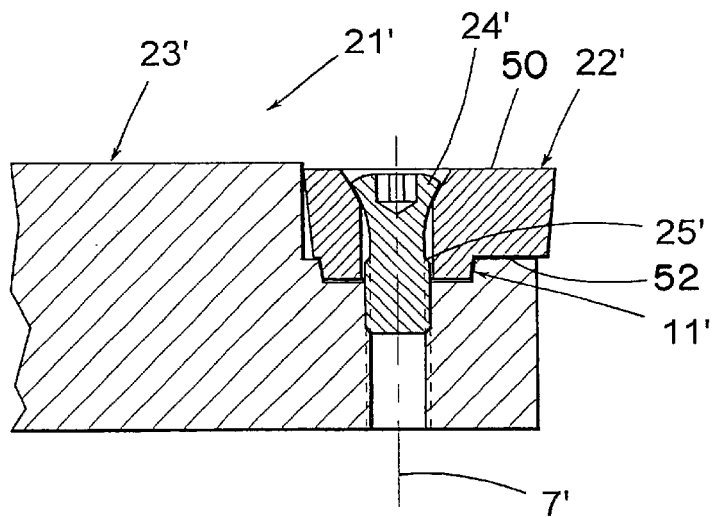
FIG. 6 shows a section along B—B in FIG. 5.

With reference to FIG. 6, each of the recesses 9 terminates axially in an axially facing wall 38 which is axially offset from the axially facing surface 36. As can be seen in FIG. 9, each tooth 12 includes a sidewall 40 extending from one adjacent recess 14 to the other adjacent recess 14. That sidewall 40 also defines one-half of a sidewall of each of the two adjacent recesses 14.

As can be seen in FIG. 9, the sidewall of each of the teeth 5, 12 has a convex free end 42 and the sidewall of each of the recesses 9, 14 has a concave bottom 44. However, the shape of the teeth 5, 12 and the recesses 9, 14 may vary widely within the scope of the invention, as illustrated in FIGS. 10–14.

As mentioned above, the tool coupling according to the present invention comprises a male part 3 and a female part 11 which are received one in the other and arranged to force-wise co-operate with each other for the transmission of torque between the tool holder 1 and the tool body 10. The first and second center axes 7, 13 coincide with each other in the assembled state of the tool coupling according to the present invention. In FIG. 3, an exploded view of the tool holder 1 and the tool body 10 is shown where the same are in position to be coupled together, i.e. the male part 3 is to be received in the female part 11. In order to bring about the necessary axial force, a screw 17 is arranged, said screw 17 being provided with external threads 18, 19 at both ends thereof. Said external threads 18, 19 co-operate with the internally threaded holes 6 and 15, respectively, whereby the male part 3 will be received in the female part 11, upon rotation of the screw 17. Normally, in that connection, a very safe securing of the tool holder 1 in relation to the tool body 10 takes place.

FIG. 4 shows a longitudinal section taken along a longitudinal section plane A—A in FIG. 9 through the mutual contact area between the male part 3 and the female part 11 at which direct abutment takes place between the conical surfaces. There is an axial gap R between the axially facing surfaces 30, 36. There is a larger axial gap T between the axially facing walls 32, 38. This means that after additional axial displacement of the male part 3 and the female part 11 towards each other, the surfaces 30, 36 will come to abutment against each other, while the axially facing walls 32, 38 will not be in contact with each other. Due to the fact that abutment takes place at the surfaces 30, 36 which, for the most part, are situated farther from the axis 7, than are the walls 32, 38, an increased stability of the tool coupling is obtained, especially pertaining to bending loads, than would be the case if the opposite walls 32, 38 were to abut against each other.

Figure 5:
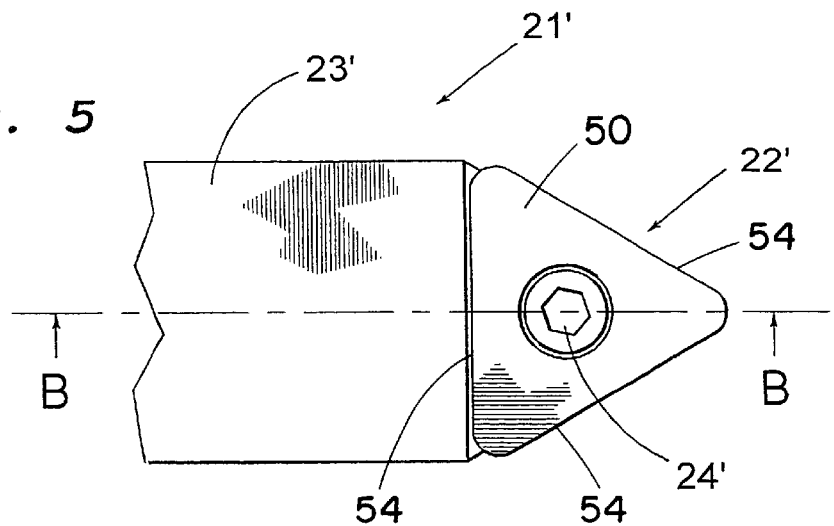
FIG. 5 shows a planar view of a turning tool, which has a tool coupling according to the present invention.
Figure 7:
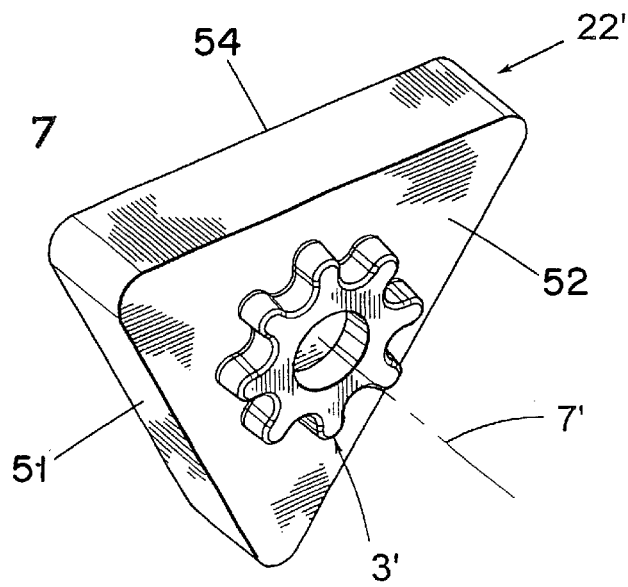
FIG. 7 shows a perspective view obliquely from below of a cutting insert which is provided with a male part of a tool coupling according to the present invention.

In FIGS. 5 and 6 a turning tool 21' is shown, which has a triangular cutting insert 22' received in an insert seat formed in a holder 23' of the turning tool 21'. The insert 22' includes top and bottom surfaces 50, 52, with the top surface 50 forming cutting edges 54. The cutting insert 22' is in the usual way secured in the insert seat by means of a securing screw 24' extending through a central hole 25' of the cutting insert 22'. The center of the hole 25' is situated on a center axis 7', which also is the center axis of the screw 24'. As is seen in FIG. 6, but still more clearly in FIG. 7, the bottom surface 52 of the cutting insert 22' is provided with a male part 3' which comprises part of the tool coupling according to this embodiment of the present invention. Said male part 3' has principally the same design as the male part 3 in the embodiment according to FIGS. 1–4, i.e. the male part 3' comprises a number of teeth 5', which are circumferentially spaced-apart from each other, and which form a tangent to an imaginary circle having its center lying on the center axis 7'. The teeth 5' extend radially away from said center axis 7'. The teeth 5' are spaced-apart by a number of recesses 9', which are circumferentially spaced-apart from each other, and which form a tangent to an imaginary circle having its center lying on the rotation axis 7'. The teeth 5' extend radially toward the rotation axis 7'. As in the case of the male part 3, the male part 3' has a slightly conical shape. The teeth 5' are spaced from a side surface 51 of the insert which interconnects the top and bottom insert surfaces 50, 52. That spacing is in a radial direction with respect to the axis 7'.

As is schematically seen in FIG. 6, the insert seat of the holder 23' is provided with a female part 11', which has principally the same design as the female part 11. Thus, when the cutting insert 22' is situated in its insert seat, the male part 3' of said cutting insert will be received in the female part 11' of the insert seat of the holder 23'. By tightening the securing screw 24', the male part 3' and the female part 11' will come into abutment against each other, preferably in the way which is illustrated in FIG. 4. When the cutting insert 22' is to be indexed, the securing screw 24' is loosened and the cutting insert 22' is turned to a position where the male part 3' and the female part 11' again fit into each other. Then the securing screw 24' is retightened.

Figure 8:
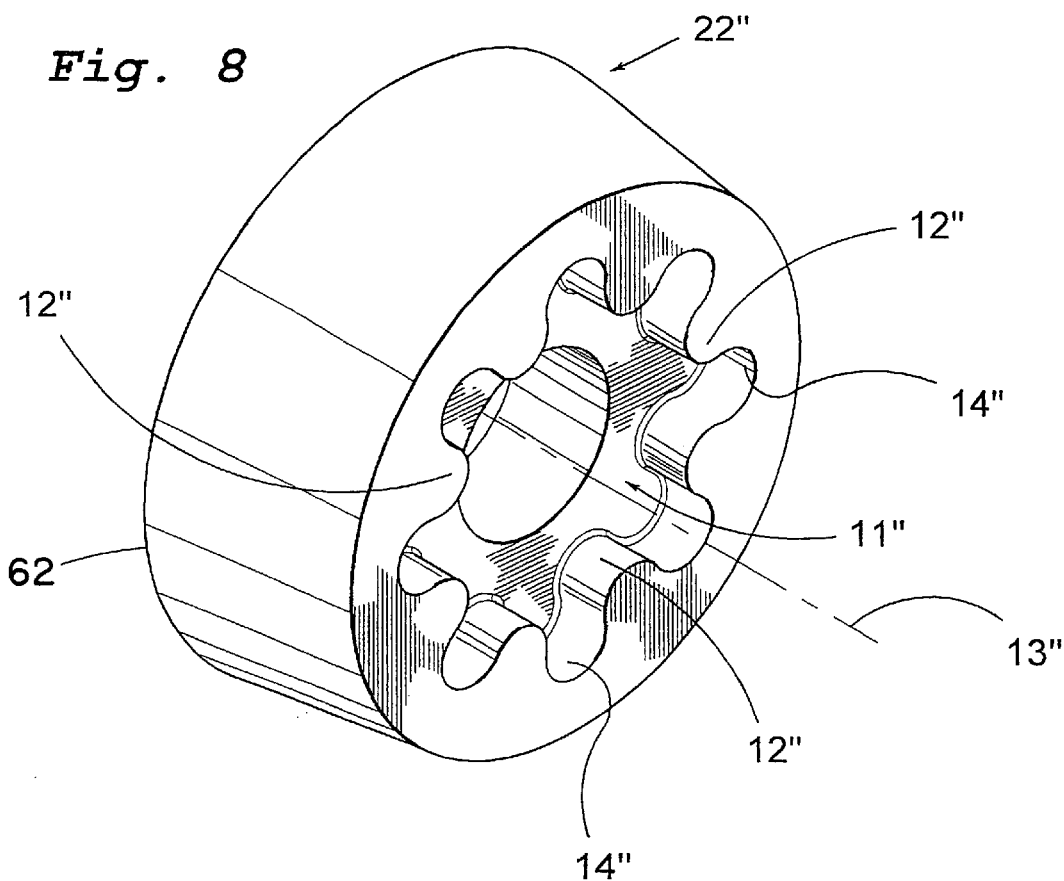
FIG. 8 shows a perspective view obliquely from below of a circular cutting insert, which is provided with a female part of a tool coupling according to the present invention.

In FIG. 8, a circular cutting insert 22" is shown, the bottom surface 60 of which is provided with a female part 11" forming part of a tool coupling according to this embodiment of the present invention, which part has principally the same design as the female part 11, i.e. the female part 11" is provided with a number of teeth 12", which are circumferentially spaced-apart from each other, and which form a tangent to an imaginary circle having its center lying on a center axis 13", and are directed towards said center axis 13". The teeth 12" are circumferentially spaced-apart by a number of recesses 14", which also are spaced-apart from each other, and which form a tangent to an imaginary circle having its center lying on the center axis 13", and extend toward said center axis 13". The female part 11" has a slightly conical shape, with a conicity which preferably equals the conicity of the female part 11. In the center of the female part 11", a second internally threaded cylindrical hole 15" is recessed having its center lying on the center axis 13".

The cutting insert 22" has a circular cutting edge 62 and is intended to be secured in an insert seat of a holder (not shown), the insert seat including a male part having a shape fitting to the female part. The circular cutting insert 22" is secured in the insert seat in a corresponding way as the triangular cutting insert 22', i.e. by means of a securing screw (not shown).

The insert 22" is shown as a turning insert, but it could be a milling insert used in a rotary milling tool, or in other stationary tools such as for parting or grooving.

In FIG. 9, a detail of a tooth 5 of the male part 3 and a tooth 12 of the female part 11 are shown, which detail is also applicable to all of the disclosed embodiments. In the above-described embodiments, during a turning operation, the female part 11 applies a restraining force or torque to the male part 3, to counteract cutting pressure, due to the fact that the tooth 12 of the female part 11 is in contact with the tooth 5 of the male part 3. In particular, and with reference to FIG. 9, the sidewall 34 of each tooth 5 has a different curvature than the sidewall 40 of the respective recess 9, whereby contact between those sidewalls 34, 40 is in the form of point-contact as the tooth 5 is viewed in a direction parallel to the axis 10 (i.e., as viewed in FIG. 9). That is, the contact occurs at two points C, C' situated on opposite sides of a line of symmetry CL of the tooth 5 (i.e., the tooth 5 is of identical configuration on both sides of the line of symmetry). It will be appreciated that the contact between the sidewalls 34, 40 actually takes place along two lines, wherein the points C, C' represent the respective ends of the two lines. Those lines are designated "M" in FIG. 4 and they converge toward one another.

During a cutting operation, a restraining force will be transmitted from the sidewall 40 to the sidewall 34 at one of the contact points C, C', depending upon the manner of cutting.

At each of the contact points C, C' a tangent line L can be drawn. It will be appreciated that the restraining force transmitted at each contact point C, C' will be directed along a line of force F, F' oriented perpendicular to the respective tangent line L.

Furthermore, a restraining angle α, α' is formed between the line of symmetry CL and the respective tangent line L (the two restraining angles α, α' being equal). Importantly, the restraining angle is in the range of −5° to +45°, preferably −2° to +25°.

Figure 10:
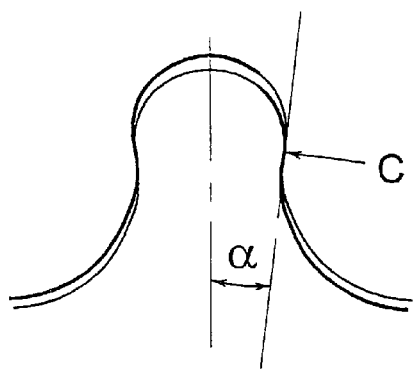
FIGS. 10, 11, 12, 13, and 14 show respective additional embodiments of co-operating teeth and recesses of a tool coupling according to the present invention.
Figure 11:
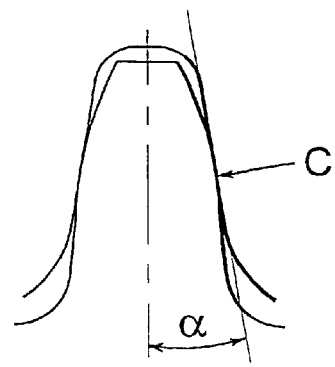
Figure 12:
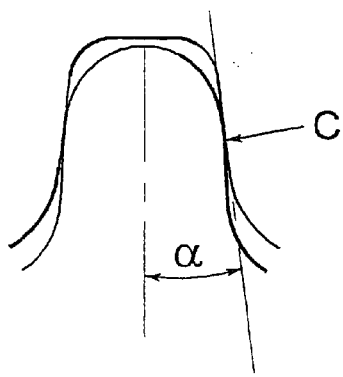
Figure 13:
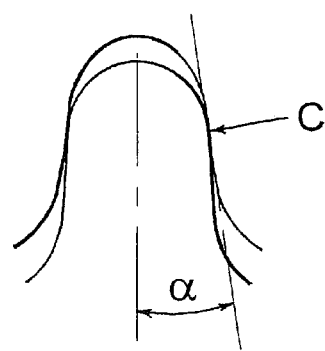
Figure 14:
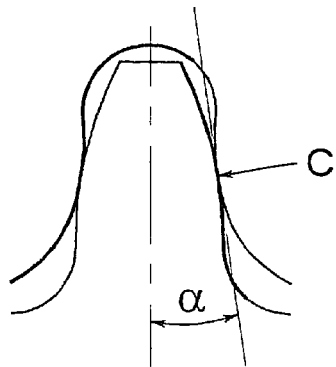

In FIGS. 10–14, the restraining angles a are shown for different embodiments of teeth and co-operating recesses of the male part 3 and the female part 11 according to the present invention. As can be seen in FIGS. 9, 11, and 12, the curvature of one of the sidewalls 34, 40 at the points of contact can be zero degrees, i.e., a linear curvature. In FIG. 9, the sidewall 34 is linear, and the sidewall 40 is convex at the contact points. In FIGS. 10 and 14 each of the sidewalls 34, 40 is convex at the points of contact. In FIG. 11 the sidewall 40 is linear and the sidewall 34 is convex. In FIG. 13, the sidewall 40 is linear and the sidewall 34 is convex at the points of contact. As is seen in FIGS. 10–14, a tooth and the cooperating recess do not have a shape corresponding with each other.

The number of teeth of the male part 3; 3' and the female part 11; 11' may vary between three and twelve, preferably six to eight.

Feasible Modifications of the Invention

In the above-described embodiments, each of the male and female parts is formed with identical teeth around the entire circumference thereof. However, it is possible, within the scope of the present invention, that the teeth of the male part and/or the female part according to the present invention could have different designs along the circumference. Thereby, a guiding of the mutual indexing of the male part and the female part can take place, i.e. they only fit together in a limited number of positions.

In the above-described embodiments, all teeth have an equally large extent (length) from the center axis 7, 13; 7'; 13". However, it is also possible, within the scope of the present invention for one or more of the teeth to have an extension (length) from the center axis 7, 13 7'; 13"that is different from the other teeth. This may, for instance, be the case if the tool coupling is desired to be indexed in a special position.

In the above-described embodiments, the male part 3; 3' can be situated on the part of the tool which carries the cutting members or which constitutes the cutting member for the chip removing machining, or on the tool body/holder. The same is true of the female part 11; 11". This variation of the location of the male part 3; 3' and the female part 11; 11" is general.

The tool coupling according to the invention can be used to hold and restrain many different types of stationary tools other than parting and grooving tools, e.g., turning tools.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. In combination:
   a stationary metal cutting tool holder having at least one seat for receiving a cutting insert;
   a mounting body for carrying the tool holder; and
   a securing element for securing the tool holder to the mounting body;
   the tool holder including a first coupling part defining a center axis, and the mounting body including a second coupling part arranged coaxially with the first coupling part;
   the first and second coupling parts being conical as viewed in a longitudinal section plane containing the axis, and being arranged one inside of the other,
   the first coupling part including teeth spaced circumferentially apart about the axis and projecting generally radially with respect to the axis, the teeth received in respective radially-open circumferentially spaced recesses formed in the second coupling part;

each of the teeth terminating in an axially facing wall and including a sidewall contacting a sidewall of the respective recess, a curvature of the tooth sidewall being different from a curvature of the recess sidewall at locations where those sidewalls contact one another, wherein such contact is in the form of a point contact on each side of a generally radial line of symmetry of the respective tooth as viewed in a direction parallel to the axis;

each of the contact points being operable to transmit a restraining force from the second coupling part to the first coupling part in a respective direction;

each of the contact points defining a tangent line, wherein the restraining force is transmitted along a line of force oriented perpendicular to a respective tangent line;

wherein a restraining angle is formed between the line of symmetry and each tangent line, each restraining angle being in the range of −5° to +45°;

the contact points disposed on one side of the line of symmetry defining a first line of contact between the tooth sidewall and the recess sidewall, and the contact points disposed on the other side of the line of symmetry defining a second line of contact between the tooth sidewall and the recess sidewall, the first and second lines converging toward one another as viewed in the longitudinal section plane.

2. The combination according to claim 1 wherein each restraining angle is from −2° to +25°.

3. The combination according to claim 1 wherein the second coupling part comprises a female part and the first coupling part comprises a male part arranged inside the female part.

4. The combination according to claim 3 wherein the male part is disposed on the tool holder, and the female part is disposed on the mounting body.

5. The combination according to claim 1 wherein the securing element comprises a screw extending along the axis.

6. The combination according to claim 1 wherein the conical shape of the first and second coupling parts are defined by a cone angle of from 1° to 30°.

7. The combination according to claim 6 wherein the cone angle is from 2° to 14°.

8. The combination according to claim 1 wherein the teeth constitute first teeth; the second coupling part including circumferentially spaced generally radially extending second teeth received in respective radially open recesses of the first coupling part.

9. The combination according to claim 1 wherein the sidewall of each of the first teeth has a convexly curved tip; and the sidewall of each of the recesses in which the first teeth are received has a convexly curved floor disposed radially opposite the convexly curved tip of the respective first teeth.

10. The combination according to claim 1 wherein the teeth project from a first axially facing surface of the tool holder; the recesses being formed in a second axially facing surface of the mounting body; the first and second axially facing surfaces opposing one another and spaced apart axially to form a first axial gap; each of the teeth terminating axially in a first axially facing wall; each of the recesses terminating in a second axially facing wall; the first axially facing walls opposing respective second axially facing walls and spaced therefrom to form respective second axial gaps larger than the first axial gap.

11. A metal cutting insert for chip-removing machining including a body having a top surface with an integral cutting edge, a bottom surface with an integral coupling part, the top and bottom surfaces facing in mutually opposite directions and interconnected by a side surface, wherein the cutting edge is formed at a junction between the top surface and the bottom surface, the coupling part defining a center axis and being conical as viewed in a longitudinal section plane containing the axis, the coupling part including a plurality of teeth spaced circumferentially apart about the axis and extending generally radially with respect to the axis, the teeth being spaced radially inwardly from the side surface.

12. The metal cutting insert according to claim 10 wherein the teeth extend generally radially away from the axis.

13. The metal cutting insert according to claim 12 wherein the teeth extend generally radially toward the axis.

14. The combination according to claim 1 wherein a dimension of each tooth in the radial direction is greater than a dimension thereof in the axial direction.

15. The combination according to claim 1 wherein the tool holder includes a surface oriented perpendicular to the center axis and on which the first coupling part is disposed; wherein the teeth of the first coupling part are spaced from an outer periphery of the surface in a direction extending radially toward the center axis.

16. The metal cutting insert according to claim 11 further including a hole extending completely through the body along the axis from the top surface to the bottom surface.

17. In combination:
a stationary metal cutting tool holder having at least one seat for receiving a cutting insert;
a mounting body for carrying the tool holder; and
a securing element for securing the tool holder to the mounting body;
the tool holder including a first coupling part defining a center axis, and the mounting body including a second coupling part arranged coaxially with the first coupling part;
the first and second coupling parts being conical as viewed in a longitudinal section plane containing the axis, and being arranged one inside of the other,
the first coupling part including teeth spaced circumferentially apart about the axis and projecting generally radially with respect to the axis, the teeth received in respective radially-open circumferentially spaced recesses formed in the second coupling part;
each of the teeth terminating in an axially facing wall and including a sidewall contacting a sidewall of the respective recess, a curvature of the tooth sidewall being different from a curvature of the recess sidewall at locations where those sidewalls contact one another, wherein such contact is in the form of a point contact on each side of a generally radial line of symmetry of the respective tooth as viewed in a direction parallel to the axis;
each of the contact points being operable to transmit a restraining force from the second coupling part to the first coupling part in a respective direction;
each of the contact points defining a tangent line, wherein the restraining force is transmitted along a line of force oriented perpendicular to a respective tangent line;
wherein a restraining angle is formed between the line of symmetry and each tangent line, each restraining angle being in the range of −5° to +45°;

wherein the securing element comprises a screw extending along the axis.

18. In combination:

a stationary metal cutting tool holder having at least one seat for receiving a cutting insert;

a mounting body for carrying the tool holder; and a securing element for securing the tool holder to the mounting body;

the tool holder including a first coupling part defining a center axis, and the mounting body including a second coupling part arranged coaxially with the first coupling part;

the first and second coupling parts being conical as viewed in a longitudinal section plane containing the axis, and being arranged one inside of the other, the first coupling part including teeth spaced circumferentially apart about the axis and projecting generally radially with respect to the axis, the teeth received in respective radially-open circumferentially spaced recesses formed in the second coupling part;

each of the teeth terminating in an axially facing wall and including a sidewall contacting a sidewall of the respective recess, a curvature of the tooth sidewall being different from a curvature of the recess sidewall at locations where those sidewalls contact one another, wherein such contact is in the form of a point contact on each side of a generally radial line of symmetry of the respective tooth as viewed in a direction parallel to the axis;

each of the contact points being operable to transmit a restraining force from the second coupling part to the first coupling part in a respective direction;

each of the contact points defining a tangent line, wherein the restraining force is transmitted along a line of force oriented perpendicular to a respective tangent line;

wherein a restraining angle is formed between the line of symmetry and each tangent line, each restraining angle being in the range of −5° to +45°;

wherein the conical shape of the first and second coupling parts are defined by a cone angle of from 1° to 30°.

19. The combination according to claim 18 wherein the cone angle is from 2° to 14°.

* * * * *